(No Model.) 2 Sheets—Sheet 2.
J. DONNAN.
TACHOMETER.
No. 539,675. Patented May 21, 1895.
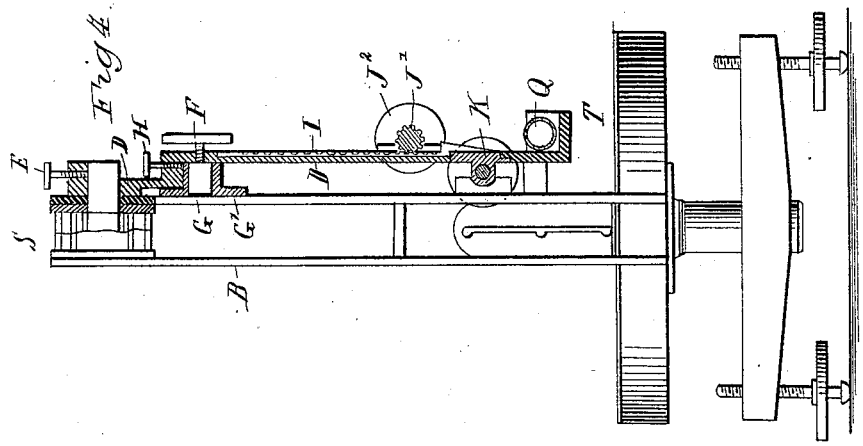
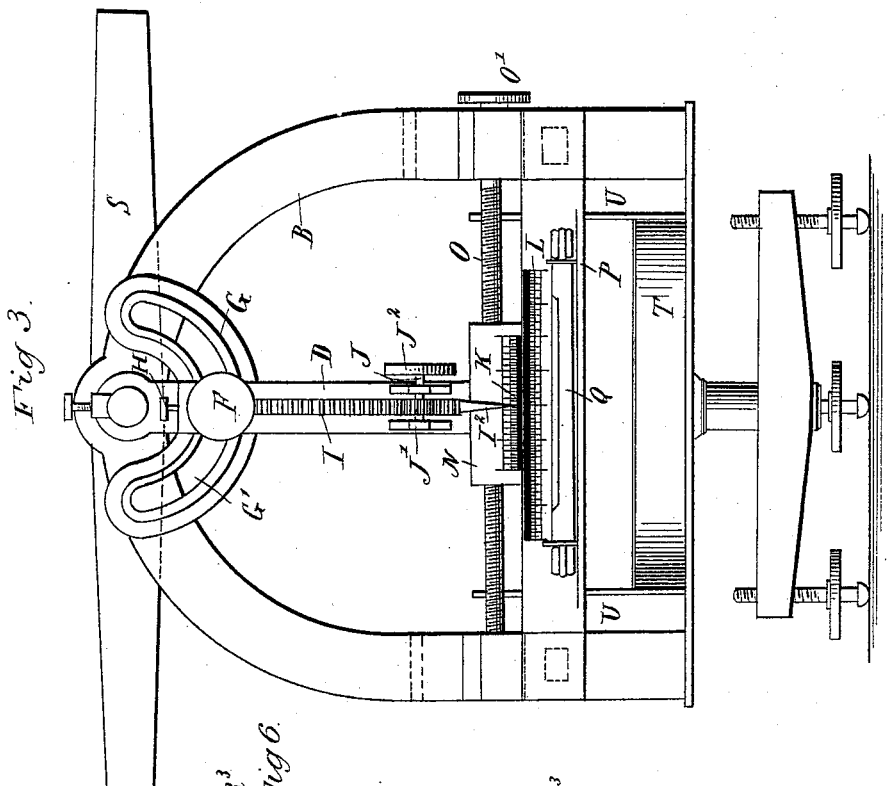
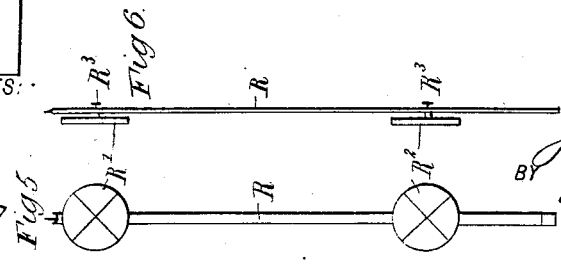
WITNESSES:
Paul Johod
Theo. G. Hoster
INVENTOR
J. Donnan
BY
Munn & Co
ATTORNEYS.

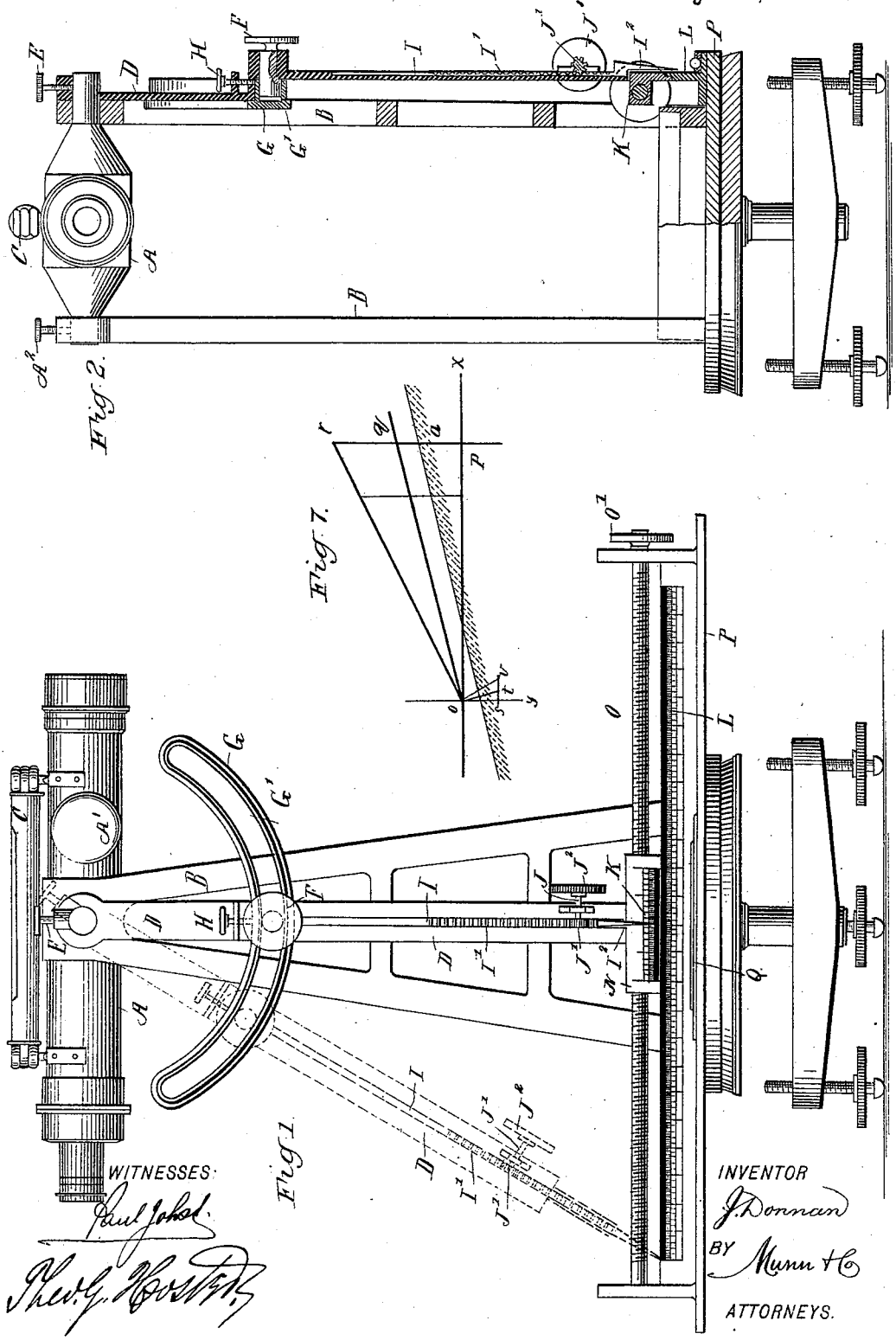
(No Model.)  2 Sheets—Sheet 1.
J. DONNAN.
TACHOMETER.
No. 539,675. Patented May 21, 1895.
INVENTOR
J. Donnan
BY Munn & Co
ATTORNEYS.

United States Patent Office.

JAMES DONNAN, OF BALAGHAUT, INDIA.

TACHOMETER.

SPECIFICATION forming part of Letters Patent No. 539,675, dated May 21, 1895.

Application filed August 9, 1894. Serial No. 519,893. (No model.)

*To all whom it may concern:*

Be it known that I, JAMES DONNAN, a subject of the Queen of Great Britain, residing at Balaghaut, in the Central Provinces, British India, have invented a new and Improved Tachometer, of which the following is a full, clear, and exact description.

The invention relates to surveying instruments, and its object is to provide a new and improved tachometer, which is comparatively simple and durable in construction, and arranged in such a manner as to enable the user to readily read off the horizontal distance of any point to, say about three thousand feet from the point of observation, through the total rise and fall of this point relative to the point of observation, and finally the bearing of this line from the magnetic north, or the horizontal angle subtended between any two lines which meet at the instrument.

The invention consists principally of an arm adapted to be fastened to one of the trunnions of the telescope, and provided with a lengthening bar indicating on a scale.

The invention also consists in certain parts and details, and combinations of the same, as will be hereinafter fully described and then pointed out in the claims.

Reference is to be had to the accompanying drawings, forming part of this specification, in which similar letters of reference indicate corresponding parts in all the views.

Figure 1 is a side elevation of the improvement. Fig. 2 is an end elevation of the same with parts in section. Fig. 3 is a side elevation of a modified form of the improvement. Fig. 4 is an end elevation of the same with parts in section. Fig. 5 is a face view of a staff. Fig. 6 is a side elevation of the same, and Fig. 7 is a diagram showing the principle underlying the invention.

The present forms of distance-measuring instruments are mostly based on one of the two following principles, viz: The angle of deviation of the telescope being constant, the height of the staff cut off varies with the distance; or the height of the staff cut off being constant, the angle of deviation varies with the distance. The staff employed in both classes of instruments is divided into sections, painted or otherwise marked on the wood. The disadvantages of these devices are that owing to the variations due to focal lengths, neither the angle of deviation nor the length of staff can be maintained truly constant for all horizontal distances, hence causing inaccuracy in the results obtained, and, second, that owing to the divisions on the staff being difficult to make out at any distance, work cannot accurately be done beyond about one thousand feet. This calls for the constant removal of the instrument, and requires a number of places of observation, thereby necessitating a great consumption of time in the setting up and re-adjustment of the instrument. If the distance of observation could be increased and the focal variations eliminated it would greatly minimize these drawbacks, and by the instrument presently to be described in detail, the above difficulties are overcome and good results obtained with accuracy at varying horizontal distances irrespective of the focal variations.

The instrument is provided with an ordinary level or theodolite telescope A mounted to turn in vertical supports, B B, the same as an ordinary theodolite, so that the telescope can move freely in a vertical plane between the supports. The eye piece of the telescope has cross wires or lines marked on it which intersect each other in the line of collimation. It is also provided with a focusing screw A', of the usual construction. A spirit level C is mounted on the top of the telescope.

On one of the trunnions of the telescope A is adapted to be fastened an arm D, by means of a set screw E, and this arm is arranged to move freely in a plane parallel to the plane in which the telescope moves, the set screw E serving to fasten the arm at any desired inclination to the line of collimation of the telescope. The arm D is adapted to be moved by a screw F, which moves in a segmental groove G' formed in an arm G fixed to one of the supports B, as plainly shown in Figs. 1 and 2. The arm D is adapted to be fastened to any part of the arm G by a clamping screw H.

In the front face of the arm D is fitted to slide a lengthening bar I, formed with rack teeth I' engaged by a pinion J' held on a shaft J journaled in suitable bearings in the arm D, the outer end of the said shaft J being provided with a hand wheel $J^2$, for conveniently turning the said shaft J, and consequently the pinion J', to move the lengthening bar I on the arm D inward or outward, as the case may require. The end of this lengthening bar I is provided with an indicator K, which is hinged to enable its point to move in a plane at right angles to the lengthening bar I.

A horizontal scale L, graduated in inches and subdivisions of one-tenth of an inch and one one-hundredth of an inch is arranged on the base P, and a vernier N is also provided having a graduated scale so that ninety-nine of the one one-hundredth of an inch division of the scale L is equal to one hundred of its divisions, it being understood that this vernier is moved backward and forward horizontally along the edge of the lower scale L, by turning the hand wheel O' of a screw O carrying the said vernier N. The index is provided on its rear face with a shoulder or offset $k$, adapted to slide over the flat face of the vernier, as will be readily understood. By means of this graduated scale L and vernier N, measurements to one ten-thousandth part of an inch can be taken.

A spirit level Q is attached to the base P, at the scale L, as indicated in the drawings.

The instrument is supplied with the usual horizontal circular plates whose edges are marked in the manner usual to theodolites for ascertaining horizontal angles. The plates are fitted with a vernier, magnifying glasses, clamping and tangent screws as usual in most theodolites, but these parts not being new are not shown in the drawings, and further description of the same is not deemed necessary. The instrument has the usual stand of three screw legs.

In connection with the instrument I make use of a staff R (see Figs. 5 and 6) preferably fifteen feet by four inches by two inches, or any other suitable size with feet and inches marked on the back. Such graduation is however not for reading off by the telescope, but merely as a guide to the placing of two disks R' and $R^2$ at any required height of the staff. The disks R' and $R^2$ are about two feet in diameter, and made to slide up and down on the staff, and adapted to be fixed at any desired height by screws $R^3$, so that a certain known distance between the centers of the two disks R' and $R^2$ exists. The disks are divided on their faces into graduations which are preferably painted red and white alternately, or in any other distinct manner to correspond with the lines on the glass of the eye-piece of the telescope A. The end of the staff which is intended to rest on the ground may have a brass shoe, and the other end may have a cap with three prongs for guy ropes. By means of these guy ropes and a short plumb fitted in the staff, the latter may be held perfectly vertical.

It is understood that the guy ropes, &c., may be done away with and the staff simply held in a vertical position by the staff holder.

The instrument is used as follows: The instrument having been set up over any peg that marks a station in the survey, the graduated scale L is adjusted so as to be perfectly horizontal, by means of the three screw legs and the spirit level Q. The arm D is then set at zero of the graduated scale, and clamped to the arm G by the screw H. The operator then adjusts the line of collimation horizontally by means of the spirit level C and the set screw E. The operator then reads all the horizontal angles that are necessary, and notes the same in the field book. The lower disk $R^2$ of the staff R is set so that its center is the same height from the bottom of the staff as the central axis of the telescope is above the ground, and then the upper disk R' is set so that the centers of the two disks R' and $R^2$ are exactly ten feet apart. This latter of course is an arbitrary measurement, but will be found a convenient distance for working the instrument properly. The staff is now sent to any point of the field at which an observation is desired to be made and the staff is now erected perfectly vertical. The operator now loosens the set screw H, by means of the screw F, shifts the arm D so as to alter the inclination of the telescope until the cross marks on the glass of the eye-piece coincide exactly with the quadrant lines of the lower disk $R^2$. The set screw H is then screwed up to fasten the arm D in place on the arm G, and then the lengthening bar I is extended by the operator turning the hand wheel $J^2$, until the point of the indicator K just touches the edge of the graduated scale L. The operator now moves the vernier N up to the point and notes the reading, using a magnifying glass for this purpose. Let the reading be .0003 inches, or as the scale shows 0.003 inches. The operator now again loosens the set screw H, and then takes the reading of the center of the upper disk R' in a similar manner. Let this be for instance .0035 or 0.035 on the scale. Now by reference to Fig. 7, it will be seen that if the instrument is set up at $o$, then $ox, o-y$ are a vertical and a horizontal line respectively through the point $o$. At any point on the surface of the ground, say at $a$, let the staff $a-q-r$ be erected so that $aq$ is equal to the height of $o$ above the ground; also let $r$ be any other point on the staff, so that the distance $rq$ is a known quantity. Now through $o$ draw the lines $ot$ and $ov$ at right angles to $oq$ and $or$ respectively, and draw $stv$ parallel to the horizontal line $ox$. Then, first, to find the horizontal distance $op$, from similar triangles:—$\dfrac{pr}{op}=\dfrac{sv}{os}$ and $\dfrac{pq}{op}=\dfrac{st}{os}$. Hence $pr=\dfrac{op\times sv}{os}$ and $pq=\dfrac{op\times st}{os}$; but $qr=pr-pq=op\left(\dfrac{sv}{os}-\dfrac{st}{os}\right)-$ i. e., $op=\dfrac{qr\times os}{sv-st}$.

The valve $os$, that is, the vertical distance from the center of the axis of the telescope to the center of the horizontal graduated scale is known for each instrument, that is, ten to six inches being a convenient size. Hence $op$, that is, the horizontal distance of the staff from $o$ the center of the instrument is ascertained. Now by using the above formula we find $op = \dfrac{qr \times os}{sv - st}$. We find $qr =$ ten feet, $os =$ ten inches or one hundred divisions of scale L. $sv = 0.035$ divisions; $st = 0.003$ divisions; therefore $op = \dfrac{10 \times 100}{.035 - .003}$ feet $= \dfrac{1,000}{.032}$ feet $= 31,250$ feet. Now let the height of the ground at which the instrument has been set up be 115.86 feet. The gradient of the rise from the instrument to the center of the lower disk was just found to be .003—that is, .003 in one hundred feet horizontal distance. Hence the total rise $= .003 \times 312.5$ feet $= 0.9375$ feet. Therefore the level of the point at which the staff has been erected equals 0.93
115.86
———
116.79 feet.

The angle subtended, the horizontal distance from the instrument and the rise or fall above any datum line can be ascertained in this manner for a series of points which are visible from the instrument.

By means of another set screw $A^2$ fixed on the axis of the telescope on the opposite side thereof to which the arm D is attached, the vertical range of observation can be greatly extended. For example, suppose the lower disk $R^2$ of the staff R is at a height beyond the range of the graduated scale L, as shown in Fig. 1. Then the gradient can be ascertained in two or more operations instead of only one. After clamping the arm D and the telescope to each other, the operator alters the inclination of the latter until the indicator reaches the division 50 on the scale, and then the set screw $A^2$ is screwed up. The operator then unscrews the set screw H and brings the arm D to zero on the scale once more, and then screws up the set screw H, and releases or unscrews the set screw $A^2$. The inclination of the telescope can then continue to be altered until the disk is visible, remembering however, to add to the reading given on the scale, fifty for each shift of the arm D back to zero.

In the modified form illustrated in Figs. 3 and 4, an instrument is shown whereby shorter distances can be ascertained without the aid of a telescope, thus reducing the cost of construction materially. By this instrument distances equal to those measured by the usual form of tachometers can be accurately measured. In place of the telescope A, shown in Fig. 1, this instrument is provided with a fore and back sight (similar to the sights of a rifle) fixed in a chamber S, the other differences being that it is provided with a compass T, having two sighting vanes U U. The divisions on the rim of the compass are marked so that the divisions at which the north end of the magnetic needle points, are the magnetic bearing of the line. The instrument is provided with three screw legs which fit into a stand of the ordinary pattern, or with any other suitable support. The method of using this modified form of instrument is similar to that described with reference to the one illustrated in Fig. 1, and described above, with the exception that the chamber S must be sighted for the middle of each disk by means of the sights in the same manner as in a rifle. The distance and levels are calculated in the same manner.

In cases in which the level is not required, there is no need for the lower disk to be the same height from the ground as the telescope A or the chamber S, but it may be placed in any convenient position so long as the distance between the upper and lower disks is ten feet or any other known and predetermined distance.

Having thus described my invention, I claim as new and desire to secure by Letters Patent—

1. In a distance measuring instrument, the combination of a pivoted telescope or the like, an arm clamped on the pivotal point thereof, a scale arranged adjacent to said arm, and a lengthening bar, mounted on and adapted to be moved longitudinally along the said arm, said lengthening bar having an index adapted to traverse said scale, substantially as set forth.

2. In a distance measuring instrument, the combination of a pivoted telescope or the like, an arm clamped on the pivotal point thereof, a scale arranged adjacent to said arm, a vernier adapted for adjustment along said scale, and a lengthening bar mounted on and adapted to be moved longitudinally along said arm, and having an index adapted to traverse the scale, substantially as set forth.

3. In a distance measuring instrument, the combination of a pivoted telescope or the like, an arm clamped thereon at the pivotal point, said arm having a longitudinal guideway, a lengthening bar arranged in said guideway and provided with a series of rack teeth, a pinion engaging said teeth whereby the lengthening bar may be slid in opposite directions, and a scale arranged adjacent to said arm and adapted to be traversed by the outer end of the lengthening bar, substantially as set forth.

4. In a distance measuring device, the combination of a telescope or the like, an arm clamped to the pivotal point thereof, a segmental guide plate for said arm, means for clamping said arm to said segmental guide, a scale arranged adjacent to said arm, and a lengthening bar adjustably secured to said arm and adapted to traverse said scale, substantially as set forth.

5. In a distance measuring instrument, the combination of a telescope or the like, an arm clamped to the pivotal point thereof, a guide plate provided with a segmental groove, a screw F on the arm projecting into said groove and adapted to play therealong, a set screw mounted on said arm and adapted to set said screw F fast to said guide plate, a scale arranged adjacent to said arm, and a lengthening bar carried by said arm and adapted to traverse said scale, substantially as set forth.

6. In a distance-measuring instrument, an arm adapted to be mounted to swing and describe an arc, a scale located adjacent to the said arm in a plane at right angles to one radius of the arc described by said arm, said scale being graduated from a central point in opposite directions, and an index carried on the arm and adapted to traverse said scale, substantially as set forth.

7. In a distance-measuring instrument, an arm adapted to be mounted to swing and describe an arc, means for setting said arm when the same is at a desired position, a straight scale located adjacent to said arm, a lengthening bar carried on the arm and adapted to be adjusted longitudinally thereof, and an index carried by the lengthening bar to traverse the said scale, substantially as set forth.

8. In a distance-measuring instrument, the combination of an arm adapted to be mounted to swing and describe an arc, a straight scale located adjacent to said arm, a vernier movable along the scale, and an index carried by the arm and adapted to traverse the scale, substantially as set forth.

9. In a distance-measuring instrument, the combination of an arm adapted to be mounted to swing and describe an arc, a straight scale located adjacent to the arm, a screw arranged parallel to the scale and adapted to be revolved, a vernier having a threaded engagement with said screw and adapted for movement parallel to the scale, and an index carried by the arm and adapted to traverse the scale, substantially as set forth.

10. In a distance-measuring instrument, the combination of an arm adapted to be mounted to swing and describe an arc, a straight scale located adjacent to the arm, a vernier adapted for movement parallel to the scale, and an index carried on the arm and provided with a shoulder adapted to rest on the vernier, substantially as set forth.

JAMES DONNAN.

Witnesses:
H. H. REMFRY,
*Solr., Calcutta.*
MAURICE REMFRY,
*Articled Clerk to W. G. Rose, Esq., Solicitor, Calcutta.*